United States Patent [19]
Kovacs

[11] Patent Number: 5,170,529
[45] Date of Patent: Dec. 15, 1992

[54] FOOT OPERABLE CART WHEEL LOCK

[75] Inventor: James E. Kovacs, Minneapolis, Minn.

[73] Assignee: Cannon Equipment Company, Cannon Falls, Minn.

[21] Appl. No.: 714,812

[22] Filed: Jun. 13, 1991

[51] Int. Cl.⁵ .............................................. B60B 33/00
[52] U.S. Cl. .................................................. 16/35 R
[58] Field of Search ............... 16/35 D, 35 R; 188/31, 188/69

[56] References Cited

U.S. PATENT DOCUMENTS

| | | | |
|---|---|---|---|
| 1,881,676 | 10/1932 | Kline | 188/31 |
| 2,050,251 | 8/1936 | Alexander | 188/31 |
| 2,154,525 | 4/1939 | Noros et al. | 16/35 R |
| 2,422,892 | 6/1947 | Forbes et al. | 16/35 R |
| 3,563,563 | 2/1971 | Radovic | 16/35 R |
| 3,860,992 | 1/1975 | Legg | 16/35 R |
| 3,986,582 | 10/1976 | Dye | 188/69 |
| 4,070,060 | 1/1978 | Howard | 16/35 R |
| 4,309,791 | 1/1982 | Aulik | 16/35 R |

FOREIGN PATENT DOCUMENTS

| | | | |
|---|---|---|---|
| 657689 | 5/1929 | France | 188/31 |
| 24889 | of 1913 | United Kingdom | 188/31 |
| 397521 | 8/1933 | United Kingdom | 188/31 |

Primary Examiner—John Sipos
Assistant Examiner—Donald M. Gurley
Attorney, Agent, or Firm—Sten Erik Hakanson

[57] ABSTRACT

A wheel lock mechanism for use in carts and the like for releasably locking an opposed pair of swivel caster wheels of such carts. The present invention includes a lever arm extending outwardly from the cart operable by the foot of an operator for moving a locking mechanism between a wheel locking position and a free wheeling position.

14 Claims, 2 Drawing Sheets

FOOT OPERABLE CART WHEEL LOCK

BACKGROUND OF THE INVENTION

1. Field of the Invention

The present invention relates generally to caster wheel lock mechanisms and, in particular, to such lock mechanisms for use in transfer carts and the like.

2. Background

A wide variety of carts are known in the art for use in the transfer or storage of materials. Many such carts typically include four swivel caster wheels for permitting easy movement thereof. It has been found that when such a cart is loaded with a sufficient weight, maneuverability thereof is enhanced by locking the leading or front pair of wheels in a substantially parallel fashion with respect to each other and with respect to the direction of travel, while allowing the remaining two rear wheels to swivel freely through 360 degrees.

Mechanisms exists for permitting the locking and unlocking of the wheels, as is needed by the operator. However, such current art lock mechanisms are not quickly operable and require the user to bend down and individually pin or lock each front wheel. Such a procedure is cumbersome, inefficient, and very undesirable, particularily when many such carts need to be transferred or moved.

Accordingly, it would be very desirable to have a wheel locking mechanism for a cart that is easily and quickly operable by the user.

SUMMARY OF THE INVENTION

The present invention comprises a device for permitting the quick locking and unlocking of a pair of swivel caster wheels. The present invention includes a rigid metal plate having a down-turned front face portion. The face portion includes a pair of notches for cooperating with a foot lever. The foot lever is rotatable and spring mounted substantially centrally of the rigid plate. The rigid plate is mounted to the bottom of a cart between two of the swivel caster wheels thereof. The plate includes a pair of position lock barrels on each end thereof adjacent each of the swivel casters. The lock barrels each have a spring mounted pin slidably engaged therein for cooperating with notches in each bearing race of the swivel casters. A pair of actuator wires extend through each pin and are secured on their opposite ends to the foot lever.

In operation, the spring mounting of the foot lever to the rigid plate provides for retaining the lever arm in one of two positions, as determined by the notches in the front face portion with which the lever arm cooperates. In a first position, the lever arm is positioned so that the actuator arms retracts the pins from engagement with the notches in each bearing race. Movement of the arm to the second notch position moves the actuator wires so that the pins extend from the lock barrels and cooperate with the notches in the swivel caster races. As the foot lever extends outwardly from the cart, it is easily manipulated by the foot of the user. Thus, it can be appreciated that the present invention provides an easy method for locking and unlocking the front caster wheels by a simple movement of the lever between two notched positions.

BRIEF DESCRIPTION OF THE DRAWINGS

A better understanding of the present invention and of the objects and advantages thereof can be had by reference to the following detailed description which refers to the following drawings wherein:

The foot operable lock mechanism of the present invention is seen in the various figures and generally referred by the numeral 10. As seen in FIG. 1, a typical four wheeled cart 12 is shown having an upper housing structure 14 and swivel caster wheels 16.

As seen in greater detail in FIGS. 3 and 4, lock mechanism 10 includes a rigid metal plate 18 having a down-turned edge portion 20 and is mounted to the bottom of cart 12. In particular, in the present embodiment, mechanism 10 has a plurality of holes 22 that are positioned to cooperate with bolts 24 used for the mounting of wheels 16. An L-shaped lever arm 26 includes a actuating end 28 and a mounting end 30. Mounting end 30 extends through plate 18 substantially centrally thereof and is spring mounted thereto by a spring 32 retained in place by the use of a washer 34 and a cotter pin 36. Actuating end 28 extends outwardly of flange 20 and rests in either of two positions thereon. Specifically, actuating end rests at either a locking position notch 38 or a free swiveling position notch 40. Actuating arm 26 also includes a plate 42 secured to end 30 for providing connection to a pair of rigid wire arms 44. Arms 44 provide for connection to a pair of wheel locking mechanisms 46 as seen in greater detail in FIG. 2. Locking mechanisms 46 include a lock barrel 48 in which a locking pin 50 is slidably mounted. Pin 50 includes a shoulder 52 for providing an area 53 of reduced diameter wherein a spring 54 is placed. Pin 50 includes a hole 56 through which an end of actuating wire 44 extends. Pin 50 includes a widened end 58 for cooperating with either of a pair of notches 60 located in opposite sides of the bearing race 62 of each of the swivel casters 16. In operation, it can be understood that the resilient mounting of actuating arm 26 provides for secure retaining of lever arm end 28 in either of notches 38 or 40, and also permits rotation of arm 26 in plate 18. As seen in FIG. 3, lever arm end 28 is retained in notch 40 and in this position pins 50 are seen to be retracted wherein ends 58 are not seated in notches 60. Thus, it can be understood that wheels 16 are free to swivel a full 360 degrees. When it is desired for the wheels to be locked in a substantially parallel position, lever arm end 28 can be moved by the foot of an operator in a direction of arrow A of FIG. 3 so that arm end 28 rests in notch 38, as seen in FIG. 4. By review of FIG. 4 it can be appreciated that movement of arm 26 in the direction of arrow A results in rotation of plate 42 and, in turn, movement of wire arms 44 and, hence, pins 50 such that pins 50 move towards wheel races 62 for engagement with notches 60. It has been found that if notches 60 are not intially aligned with pins 50, a little movement of the cart in a substantially straight line will cause the wheels to extend in a parallel manner in the direction of movement permitting notches 60 to register with pins 50. Conversely, when it is desired to unlock wheels, movement of lever arm end 28 in the direction of arrow B, as seen in FIG. 4, results in the release of pins 50 from notches 60 of wheel races 62.

Figure 1:
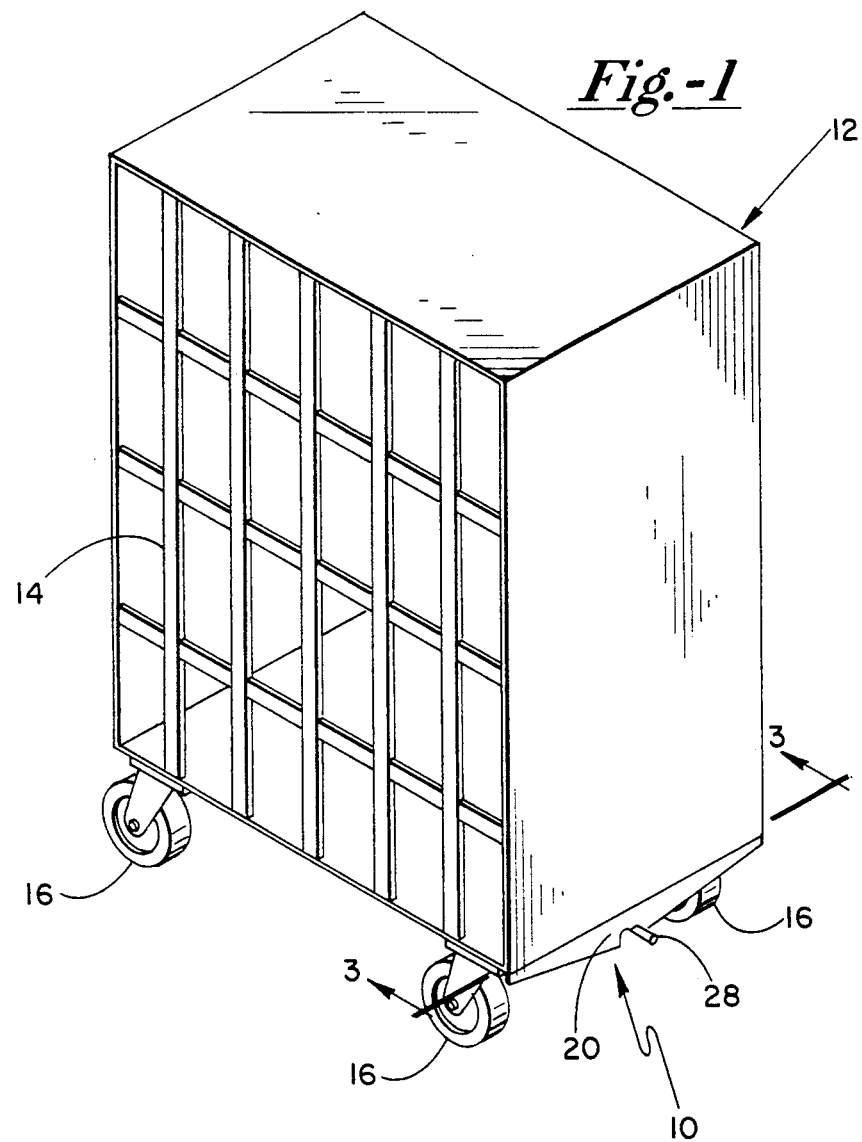
FIG. 1 shows a perspective view of a typical cart with the swivel caster lock mechanism of the present invention thereon.
Figure 2:
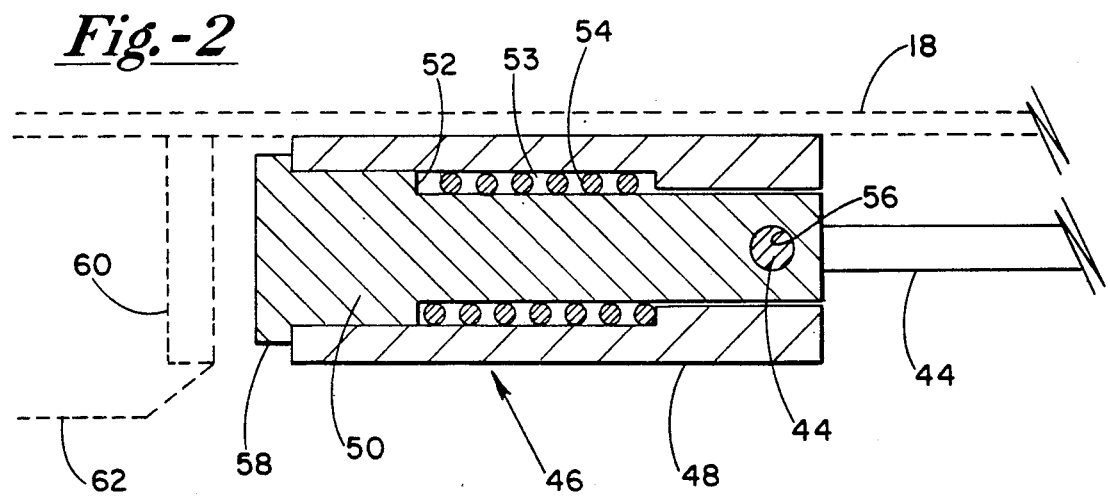
FIG. 2 shows an enlarged cross-sectional view of the pin locking mechanism.
Figure 3:
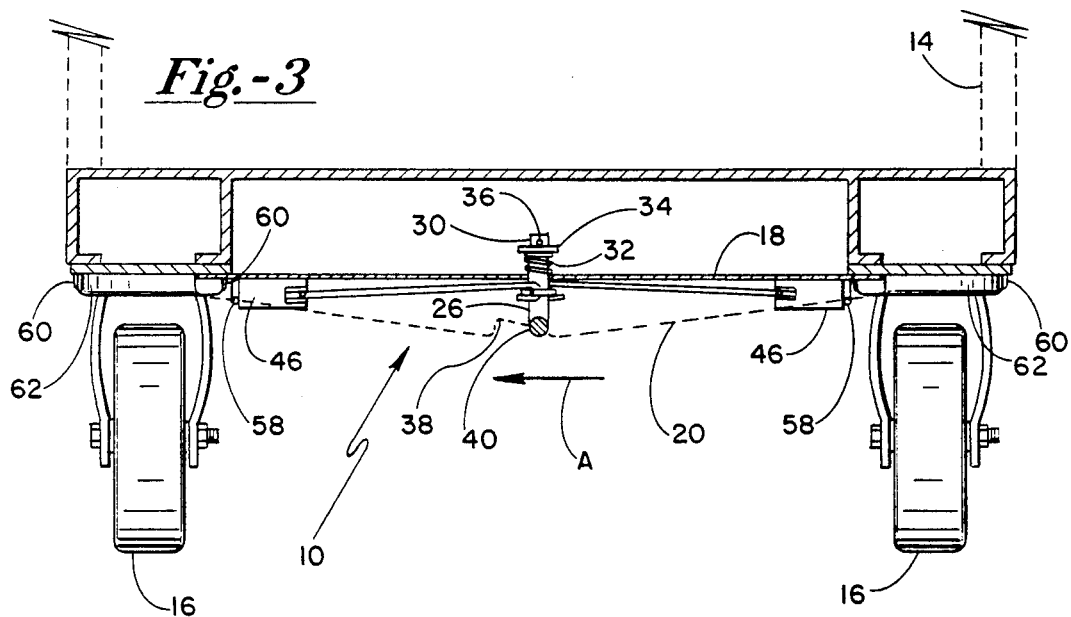
FIG. 3 shows an enlarged cross-sectional view along lines 3—3 of FIG. 1.
Figure 4:
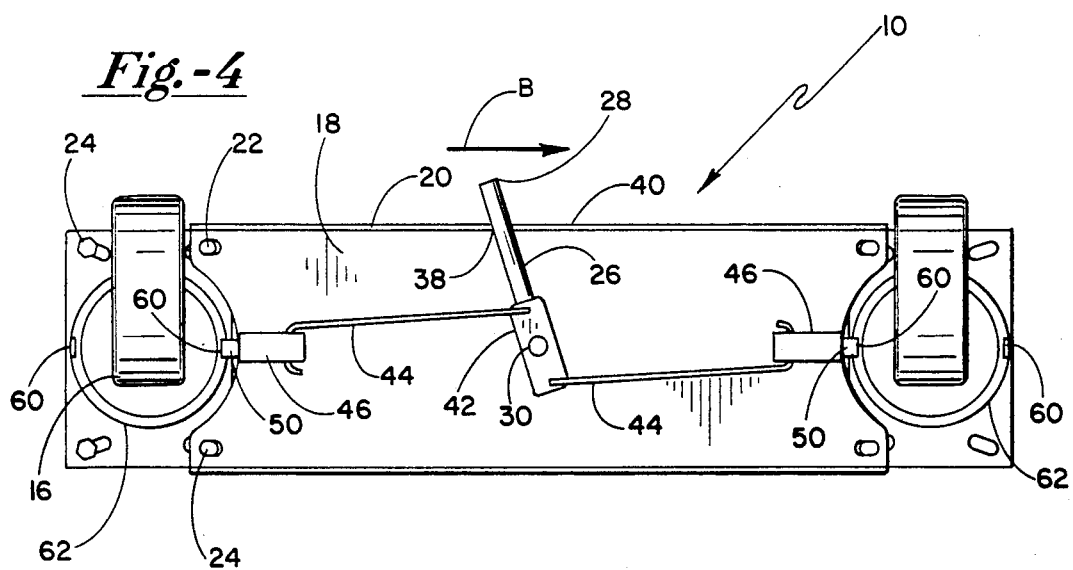
FIG. 4 shows a bottom plan view of the present invention as secured to a cart.

It can be appreciated by those of skill that the present invention can be made as add-on to existing carts, as shown herein, or, of course, could be made as in integral part of a new cart.

I claim:

1. A wheel lock mechanism for a conveyance means, the conveyance means for conveying articles retained thereon, the conveyance means having a base and the base having a first end and a second end opposite therefrom, the first end having a first pair of swivel mounted wheels secured at opposite ends thereof and the second end having a second pair of swivel mounted wheels secured at opposite ends thereof, the wheel lock mechanism, comprising:

a locking pin means slidably mounted on a bottom surface of the base adjacent each of the first pair of wheels, and the pin means extending between the first pair of wheels and adjacent the base first end, each locking pin means providing releasable engagement with receiving means of each adjacent first pair wheel, lever means mounted below the bottom surface of the base and having a first end and a second end, the lever means first end rotatively secured to the base about a vertical axis intermediate the lever first end and wherein the second end extends beyond the base and adjacent the base first end for facilitating operation of the lever means through a horizontal plane substantially parallel to the base by a foot of an operator, the lever means operably connected to each of the locking pin means by a pair of rigid connecting means, each connecting means having a first end connected to one of the pin means and a second end pivotally connected to the lever means first end on opposing sides of the vertical axis thereof so that operation of the lever means results in rotation thereof in a first rotational direction about for moving the connecting means wherein the locking pin means move into locking engagement with the receiving means of each wheel adjacent thereto and wherein operation of the lever means in a second rotational direction opposite from the first rotational direction provides for moving the connecting means wherein the locking pin means are removed from engaging with the receiving means of each wheel adjacent thereto so that the first pair of wheels can be alternately locked in equivalent parallel positions or allowed to swivel in free wheeling positions respectively, and the base first end including a first notch means for receiving the lever means for retaining the lever means in a wheel locking position wherein the wheel first pair are retained in the equivalent locked positions when the lever means is rotated in the direction and the first base first end having a second notch means for receiving the lever means for retaining the lever means in a free wheeling position wherein the first wheel pair are in the free wheeling position when the lever means is rotated in the second direction.

2. The mechanism as defined in claim 1, and including a lip extending substantially vertically along the base first end between the first wheel pair, the lip having the first and second notches therein.

3. The mechanism as defined in claim 2, and each locking pin means slidably mounted within a barrel and the barrel including pin biasing means for biasing the locking pin means in a direction toward the wheel adjacent thereto.

4. The mechanism as defined in claim 3, and the first wheel pair each having a bearing race and the receiving means comprising notches in the bearing race.

5. The mechanism as defined in claim 4, wherein said lever means first end comprises a plate secured to the lever means about the vertical axis and extending equally on either side thereof in a plane substantially parallel to the base and having a plate first end and plate second end, and one of the connecting means first ends pivotally secured to the plate first end and the other connecting means first end pivotally connected to the plate second end so that the connecting means are attached to the lever means at spaced positions for facilitating operation of the wheel lock mechanism.

6. The mechanism as defined in claim 1, and each locking pin means slidably mounted within a barrel and the barrel including pin biasing means for biasing the locking pin-means in a direction toward the wheel adjacent thereto.

7. The mechanism as defined in claim 1, and the first wheel pair each having a bearing race and the receiving means comprising notches in the bearing race.

8. A wheel lock mechanism for a conveyance means, the conveyance means for conveying articles retained thereon, the conveyance means having a base and the base having a first end and a second end opposite therefrom, the first end having a first pair of swivel mounted wheels secured at opposite ends thereof and the second end having a second pair of swivel mounted wheels secured at opposite ends thereof, the wheel lock mechanism, comprising:

a locking pin means slidably mounted on the base bottom surface adjacent each of the first pair of wheels, and the pin means extending between the first pair of wheels and adjacent the base first end, each locking pin means for providing releasable engaging with receiving means of each adjacent first pair wheel, lever means, the lever means generally L-shaped having an attachment portion and an operable portion extending transversely thereto, the lever means attachment portion pivotally secured to the base about a vertical axis so that the lever is rotatable about a central axis of the lever attachment portion wherein the operable portion moves in a plane substantially parallel to the base, and the lever operable portion extending below and beyond the base and adjacent the base first end for facilitating operation thereof by a foot of an operator, the lever means operably connected to each of the locking pin means by a pair of rigid connecting means, each connecting means having a first end connected to one of the pin means and a second end pivotally connected to the lever means on opposing sides of the attachment portion thereof so that operation of the lever operating portion results in rotation of the lever means in a first rotational direction about its pivotal mounting for moving the connecting means wherein the locking pin means move into locking engagement with the receiving means of each wheel adjacent thereto and wherein operation of the lever means in a second rotational direction opposite from the first rotational direction provides for moving the connecting means wherein the locking pin means are removed from engaging with the receiving means of each wheel adjacent thereto so that the first pair of wheels can be alternately locked in equivalent parallel positions or allowed to swivel in free wheeling positions respectively, and the base first end including a first notch means for receiving and retaining the lever operating portion in a wheel locking position wherein the first wheel pair are retained in the equivalent locked positions when the lever means is rotated in the first direction and the base first end having a second notch means for receiving and retaining the lever operating portion in a free wheeling position for retaining the first wheel pair in the free wheeling position when the lever means is rotated in the second direction.

9. The mechanism as defined in claim 8, and including a lip extending substantially vertically along the base first end between the first wheel pair, the lip having the first and second notches therein.

10. The mechanism as defined in claim 9 and each locking pin means slidably mounted within a barrel and the barrel including pin biasing means for biasing the locking pin means in a direction toward the adjacent wheel.

11. The mechanism as defined in claim 10, and the first wheel pair each having a bearing race and the receiving means comprising notches in the bearing race.

12. The mechanism as defined in claim 11, wherein said lever means first end comprises a plate secured to the lever means about the vertical axis and extending equally on either side thereof in a plane substantially parallel to the base and having a plate first end and plate second end, and one of the connecting means first ends pivotally secured to the plate first end and the other connecting means first end pivotally connected to the plate second end so that the connecting means are attached to the lever means at spaced positions for facilitating operation of the wheel lock mechanism.

13. The mechanism as defined in claim 8, and the first wheel pair each having a bearing race and the receiving means comprising notches in the bearing race.

14. The mechanism as defined in claim 8, and each locking pin means slidably mounted within a barrel and the barrel including pin biasing means for biasing the locking pin means in a direction toward the adjacent wheel.

* * * * *